(12) United States Patent
Günter

(10) Patent No.: US 9,205,806 B2
(45) Date of Patent: Dec. 8, 2015

(54) METHOD FOR CONTROLLING A VEHICLE BOOT LID OF A VEHICLE AND ASSOCIATED VEHICLE

(75) Inventor: Christian Günter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/240,657

(22) PCT Filed: Aug. 4, 2012

(86) PCT No.: PCT/EP2012/003343
§ 371 (c)(1),
(2), (4) Date: Feb. 24, 2014

(87) PCT Pub. No.: WO2013/026529
PCT Pub. Date: Feb. 28, 2013

(65) Prior Publication Data
US 2014/0219508 A1   Aug. 7, 2014

(30) Foreign Application Priority Data
Aug. 25, 2011   (DE) .......................... 10 2011 111 600

(51) Int. Cl.
*G06K 9/00* (2006.01)
*B60R 25/01* (2013.01)
*B60R 25/20* (2013.01)
*E05F 15/73* (2015.01)

(52) U.S. Cl.
CPC ............. *B60R 25/01* (2013.01); *B60R 25/2045* (2013.01); *B60R 25/2054* (2013.01); *E05F 15/73* (2015.01); *E05F 2015/767* (2015.01); *E05Y 2900/546* (2013.01); *E05Y 2900/548* (2013.01)

(58) Field of Classification Search
None
See application file for complete search history.

(56) References Cited

U.S. PATENT DOCUMENTS

| 2005/0193212 | A1* | 9/2005 | Yuhara .......................... 713/186 |
| 2006/0290518 | A1* | 12/2006 | Bingle et al. ............... 340/573.1 |
| 2007/0018813 | A1 | 1/2007 | Liggitt |
| 2007/0045019 | A1 | 3/2007 | Carter et al. |
| 2010/0250052 | A1 | 9/2010 | Ogino |

(Continued)

FOREIGN PATENT DOCUMENTS

| DE | 198 18 263 | 10/1999 |
| DE | 103 41 691 | 3/2005 |
| DE | 102005042402 | 3/2007 |

(Continued)

OTHER PUBLICATIONS

Harumoto Satoru et al., JP Publication JP2005-315024 published on Nov. 10, 2005, cited by applicant in IDS submitted on Apr. 22, 2014, translation obtained via Patent Abstracts of Japan (PAJ) on Mar. 22, 2015. Available Online at:https://www4.j-platpat.inpit.go.jp/cgi-bin/tran_web_cgi_ejje?u=http://www4.j-platpat.inpit.go.jp/eng/translation/.*

(Continued)

*Primary Examiner* — Tahmina Ansari
(74) *Attorney, Agent, or Firm* — Henry M. Feiereisen LLC

(57) ABSTRACT

A method for controlling a vehicle lid of a vehicle includes the following steps: A user is identified in the vicinity of the lid; at least one image of the user is captured by a camera; the captured image is evaluated as to whether the lid needs to be opened; and if necessary, opening the lid.

8 Claims, 2 Drawing Sheets

(56) References Cited

U.S. PATENT DOCUMENTS

2010/0327770 A1    12/2010  Pados et al.
2014/0219508 A1*    8/2014  Gunter .................. 382/104

FOREIGN PATENT DOCUMENTS

| DE | 102006037237 | 2/2008 |
| DE | 102009030174 | 12/2010 |
| DE | 102010016088 | 12/2010 |
| DE | 102009040395 | 4/2011 |
| EP | 0 994 444 | 4/2000 |
| EP | 1 571 601 | 9/2005 |
| JP | 2005-315024 | 11/2005 |
| JP | 2010-236184 | 10/2010 |

OTHER PUBLICATIONS

International Search Report issued by the European Patent Office in International Application PCT/2012/003343 on Nov. 27, 2012.

* cited by examiner

METHOD FOR CONTROLLING A VEHICLE BOOT LID OF A VEHICLE AND ASSOCIATED VEHICLE

CROSS-REFERENCES TO RELATED APPLICATIONS

This application is the U.S. National Stage of International Application No PCT/EP2012/003343, filed Aug. 4, 2012, which designated the United States and has been published as International Publication No. WO 2013/026529 and which claims the priority of German Patent Application, Serial No. 10 2011 111 600.5, filed Aug. 25, 2011, pursuant to 35 U.S.C. 119(a)-(d).

BACKGROUND OF THE INVENTION

The invention relates to a method for controlling a lid of a vehicle.

Vehicles with a lid (tailgate or trunk lid) can be opened either manually by operating a switch in or on the vehicle or by operating a remote control key.

Vehicles are also known wherein the lid is opened automatically after authentication of an authorized user.

An access control device for vehicles is known from DE 198 18 263 A1, wherein a user carries a portable identification transmitter which communicates with a transceiver unit arranged in the motor vehicle. The user is identified by a sensor system, preferably by a motion sensor. If appropriate, a release is performed after evaluation, thereby enabling access to the motor vehicle.

It is proposed in EP 1 571 601 A2 to provide the driver with an information carrier to thereafter allow authentication of certain vehicle functions.

DE 103 41 691 A1 relates to a portable electronic key of a motor vehicle locking system. The portable electronic key includes an image capture device for capturing biometric features of the user, in particular for detecting characteristic facial features of the user, for a comparison of the acquired data with stored data, wherein the motor vehicle locking system can be unlocked when a match is detected.

EP 0 994 444 A2 relates to a method for enabling operation of a motor vehicle, as well as a chip card and an associated vehicle device. To gain access to certain functions of a motor vehicle, for example for switching on the ignition, the user needs the chip card, which is inserted into a reading device. In addition, personal and biometric data are collected, for example, voice signals or image patterns of the user's face in order to prevent unauthorized use of the motor vehicle, even when the unauthorized user is in possession of the correct smart card.

DE 10 2005 042 402 A1 describes a vehicle with an automatically opening lid, wherein a "Comfort Access" is realized by allowing a driver access to the vehicle, without requiring a car key or a remote control. Instead, it is sufficient when the driver carries with him a remote control or a wireless key as authentication means, whereafter an automatic opening operation of the motor-driven vehicle lid is initiated. However, an open operation is also initiated when an unauthorized user has acquired the authentication means.

To avoid this disadvantage, it is proposed in DE 10 2006 037 237 A1 to detect a movement pattern or a movement flow in addition to an authentication of the user by an identification transmitter. For this purpose, the user performs with the mobile identification transmitter a predetermined movement pattern, which may include, for example, two directions of movement. However, performing the required movements may be difficult, for example when the user is carrying items.

As a further improvement, it has been proposed in DE 10 2009 040 395 A1 to detect in addition to an authentication of the user based on a mobile identification transmitter a predetermined movement pattern of "another object" Advantageously, the user then does not need to hold the mobile identification transmitter in his hand to perform a particular movement pattern; instead, the movement pattern can be generated, for example, when the user moves his leg. However, such control is not particularly comfortable for the user, for example, when he needs to move a leg loaded with baggage.

SUMMARY OF THE INVENTION

It is therefore the object of the invention to provide a method for controlling a lid of a vehicle, which is comfortable for the user and, at the same time, allows the lid to be reliably opened.

This object is attained according to the invention with a method of the aforementioned type with the following steps:
identifying a user present in the vicinity of the lid;
capturing at least one image of the user with a camera;
evaluating the captured image to determine whether the lid needs to be opened; and
if necessary, opening the door.

The inventive method has the advantage that the lid is opened only when a user has previously been identified and when an evaluation of an image has confirmed that the user wishes to open the lid, i.e. that the lid should indeed be opened. This method of opening the lid is particularly convenient for the user because he is not required to press either a button on a remote control key or a switch on or in the vehicle. Furthermore, performing a specified movement pattern which is difficult to perform with luggage is also eliminated. Instead, the inventive method provides that, after the user has been identified, an image is captured at a second step, which is subsequently analyzed in order to decide whether it is required or desired to open the lid. If it is determined that opening of the lid is desired, the door is opened by a motor.

It is also within the scope of the method according to the invention, that the user is identified based on a remote key carried by the user. In this case, this is not a mechanical key in the conventional sense, and a transponder is used instead, which is configured to carry out bidirectional communication with a corresponding radio module of the vehicle, thereby enabling identification.

The inventive method can be particularly easily performed when the image is recorded with a rearview back-up camera. Such a rearview back-up camera is often already installed in modern vehicles, so that the inventive method results in only small additional costs. In addition, the rearview back-up camera is usually installed inconspicuously, so that the visual appearance of the vehicle is not compromised.

A refinement of the method of the invention provides that it is determined in the evaluation of captured image, whether the user carries baggage and/or has with him a shopping cart. The captured image of the user created is subjected to image analysis, wherein it is checked whether the captured image contains certain patterns or objects. Examples include a shopping cart, which can be detected from the contour or based on characteristic lines or edges; in addition, typically carried items, such as carrying bags, shopping bags or packages, can be extracted and recognized within the context of the image analysis. In addition, items such as a suitcase, a backpack, etc. can be detected and identified within the context of the image analysis. When it is detected that the user carries one of the listed typical items, the lid is automatically opened. This opening process is particularly convenient for the user because he only needs to carry with him the radio-enabled identification feature, thereby obviating the need to press a switch or a pushbutton or perform a specified movement pattern.

A refinement of the method of the invention provides that an optical signal is outputted after the identification of a user, in particular by a lamp, preferably by an LED (light emitting diode). The user can then advantageously recognize whether identification has been successfully completed. When the user sees the optical signal, he can assume that the lid of the vehicle will shortly be opened automatically.

A refinement of the method of the invention may provide that the user performs an approving or a disapproving movement after the identification, which is captured in an image, wherein the lid is opened after an approving movement and not opened after a disapproving movement. This prevents unintentional opening of the lid in situations where it is not desired by the user. Conceivably, the user may not want to load a piece of luggage or another item through the tailgate or the trunk, and instead may want to load through a vehicle door. To avoid accidental opening in such cases, the method is designed in two stages wherein initially the user is identified, with a successful identification preferably being indicated by an optical signal. Subsequently, the user may perform a movement pattern at a second method step, wherein an image is captured by the camera, which is then subjected to image analysis. The lid is opened when a fixed movement pattern has been recognized in the context of the image analysis; otherwise, the lid is not opened. A particular movement pattern is interpreted as an approval, whereas another movement pattern is interpreted as disapproval. The lid is not opened when no approving movement pattern is recognized. To recognize the movement pattern, not only a single image (still image) may be captured, but a sequence of images may instead be recorded as a motion picture, which is also subjected to a suitable analysis, preferably in real time, to detect a predetermined movement pattern.

In addition, the invention relates to a motor vehicle, having a lid, means for identifying a user, and a camera for capturing an image of the user.

The motor vehicle according to the invention is characterized in that it includes a control device which is configured to evaluate the captured image in order to determine whether the lid needs to be opened, as well as for opening the lid.

Further details of the invention are recited in the dependent claims.

BRIEF DESCRIPTION OF THE DRAWING

Further advantages and details of the invention are explained below based on an exemplary embodiment with reference to the drawings. The drawings are schematic diagrams and show in:

FIG. 1 shows a flow diagram of the essential steps of the method for controlling a lid of a vehicle.

DETAILED DESCRIPTION OF PREFERRED EMBODIMENTS

At the first step of the method, identification 1 of a user is performed. The identification 1 is based on an identification feature carried by the user. This is a transponder configured to perform two-way communication with a suitably designed vehicle-mounted transponder. The identification 1 takes place when the user is located in the area behind the vehicle or near this area. In this situation, a rearview back-up camera of the vehicle is activated and an image is captured. In the simplest case, only a single image 2 is captured; preferably, however, an image sequence is captured as a motion picture.

The captured image is then subjected at the next step to an image analysis 3. Within the context of the image analysis 3, certain characteristic items are identified based on their outline, their shape or size. The image analysis is performed in a control device, and it is determined with image processing software whether a captured image shows for example a shopping cart, shopping bags, carrying bags or the like. Image processing software is capable of learning, so that detected items are stored so that these items can later be identified more quickly.

If the image analysis 3 has shown that the user carries with him a relevant item, such as a shopping cart, and that the user is located in the rear area of the vehicle or approaches the rear area, it is checked at the next step 4 whether the user desires to open the lid. Subsequently, at step 5, the lid is opened. Otherwise, if no relevant object could be detected within the context of image analysis 3, it is concluded at step 4 that opening the door is not desired. The method is then terminated at step 6. The process is reinitiated when a user approaches the locked vehicle, carrying the identification feature.

Figure 1:
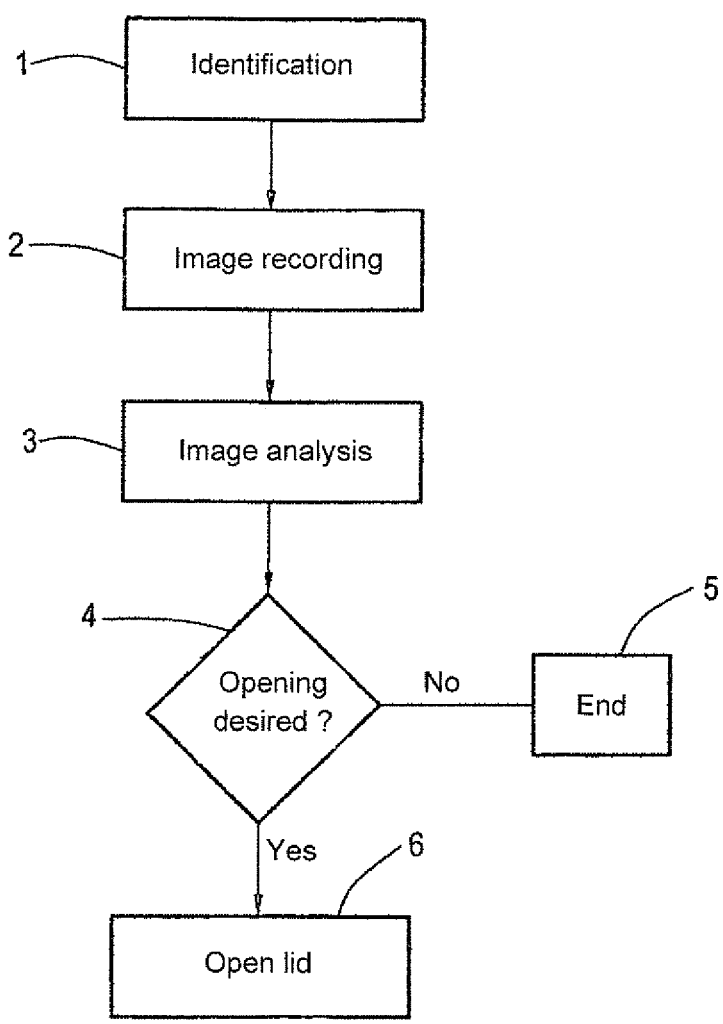
FIG. 1 a flow diagram with the essential steps of the method according to the invention for controlling a lid of a vehicle.
Figure 2:
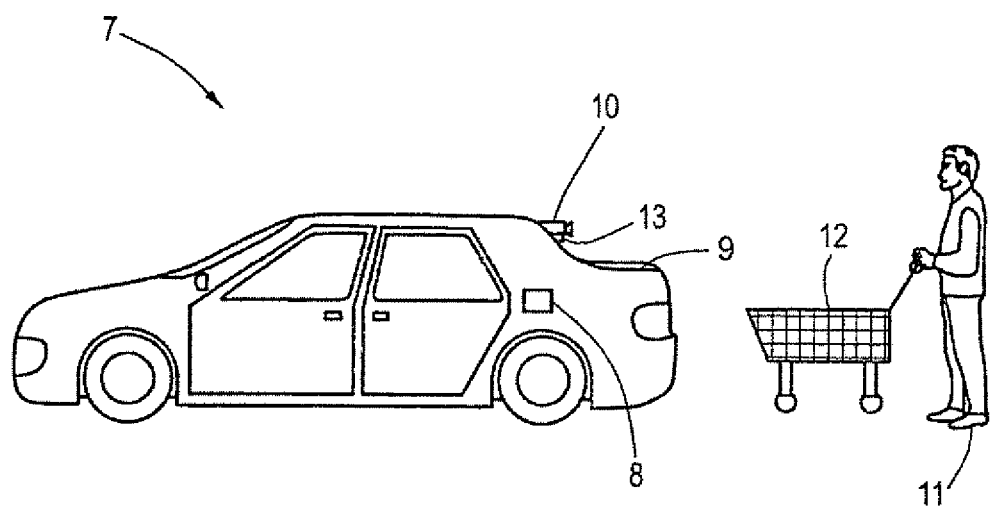
FIG. 2 a motor vehicle according to the invention.

FIG. 2 shows a vehicle 7, with a control device 8 performing the image analysis and, optionally, opening a lid 9. A rearview back-up camera 10 is located at the rear of the vehicle, which monitors the rear area of the vehicle 7 and captures an image of a user 11 when the user 11 approaches the rear area with luggage or—as shown in FIG. 2—with a shopping cart 12.

In addition, a light emitting diode 13 is disposed in the vicinity of the camera 10, which lights up when identification 1 of the user 11 was successful.

The user 11 may then perform a movement, for example, by nodding his head, wherein this movement is also captured by the rearview back-up camera 10. The captured image 2 is then evaluated by image analysis 3, wherein the nod by the user 11 is interpreted as approval, whereafter the lid 9 is opened.

Alternatively, the user 11 may perform a disapproving movement, for example, by shaking his head. It is thus likewise detected within the context of the image processing 3 that opening of the lid 9 is not desired, so that unwanted opening of the lid 9 is prevented.

The invention claimed is:

1. A method for controlling a lid of a vehicle, comprising: identifying a user present in the vicinity of the lid; capturing with a camera at least one first image of the user, evaluating the at least one captured image to determine, whether the user carries baggage or carries a shopping cart, or both; subsequently capturing with the camera at least one second image and analyzing the at least one second image to detect a movement pattern representing an approving or a disapproving movement by the identified user, and opening the lid when the detected movement pattern is interpreted as the approving movement and not opening the lid when the detected movement pattern is different from the approving movement or when the detected movement pattern is interpreted as the disapproving movement in order to prevent the lid from being opened accidentally.

2. The method of claim 1, wherein the user carries a remote key and is identified based on the remote key.

3. The method of claim 1, wherein the camera comprises a rearview back-up camera.

4. The method of claim 1, further comprising outputting an optical signal after identification of the user.

5. The method of claim 4, wherein the optical signal is outputted by a light-emitting diode (LED).

6. The method of claim 1, wherein the approving or disapproving movement is detected as an image sequence or as a motion picture.

7. A motor vehicle comprising: a lid, a transponder for identifying a user, a camera for capturing a first image and a second image of the user, and a control device configured to evaluate the captured first image and to determine from the captured first image whether the user carries baggage or carries a shopping cart, or both, to detect, in the captured second image a movement pattern representing an approving movement or a disapproving movement by the identified user, and to open the lid when the detected movement is interpreted as the approving movement and not to open the lid when the detected movement pattern is different from the approving movement or when the detected movement pattern is interpreted as the disapproving movement, in order to prevent the lid from being opened accidentally.

8. The motor vehicle of claim 7, wherein the camera is a rearview back-up camera.

\* \* \* \* \*